3,758,479
NITRO AND SULPHAMOYL SUBSTITUTED
DIBENZODIAZEPINES
Jean Schmutz and Fritz Hunziker, Bern, Switzerland,
assignors to Sandoz-Wander, Inc.
No Drawing. Application Oct. 21, 1968, Ser. No. 769,373,
now Patent No. 3,539,573, dated Nov. 10, 1970, which
is a continuation-in-part of abandoned application Ser.
No. 712,956, Mar. 14, 1968. Divided and this application July 6, 1970, Ser. No. 60,976
Claims priority, application Switzerland, Mar. 22, 1967,
4,103/67; May 9, 1967, 6,557/67; July 14, 1967,
10,115/67; Nov. 3, 1967, 15,453/67
Int. Cl. C07d 51/70
U.S. Cl. 260—268 TR    3 Claims

ABSTRACT OF THE DISCLOSURE 2 nitro and 2 - dimethylaminosulfonyl-11-(piperazinyl and 4 - methyl piperazinyl)-dibenzo[b,e][1,4]diazepines are prepared. They are useful as C.N.S. agents.

---

This is a division of then copending U.S. patent application Ser. No. 769,373, filed Oct. 21, 1968, which issued as U.S. Pat. No. 3,539,573 on Nov. 10, 1970, said application being in turn a continuation-in-part of then copending U.S. patent application Ser. No. 712,956, filed Mar. 14, 1968, now abandoned.

The object of the present invention is to provide 11-basic-substituted dibenzo[b,e][1,4]diazepines and dibenzo[b,f][1,4]thiazepines useful for producing such pharmacologically significant action in standard test animals as analgesic action, sedative and motility depressing action, parasympatholytic action, antihistaminic action, antitetrabenazine action and apomorphinantagonistic action. These compounds can also be embodied in therapeutically useful forms for use as analgesics, antihistaminics, sedative and motility depressing agents, parasympatholytic agents, antiallergics, adrenolytics, neuroplegics, neuroleptics, neuroleptic antidepressants and antiemetics.

A further object of the invention is to provide 11-basic substituted dibenzo[b,e][1,4]diazepines and dibenzo[b,f][1,4]thiazepines having the above-mentioned actions of the general formula

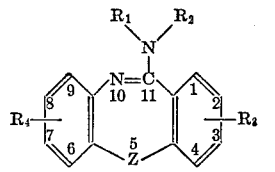

(I)

and acid addition salts thereof. In Formula I, Z denotes bivalent sulfur, imino, or lower alkyl imino; $R_1$ represents hydrogen or alkyl with 1 to 5 carbon atoms; $R_2$ denotes hydrogen, alkyl with 1 to 5 carbon atoms, phenyl, $R_5$-substituted phenyl, aminoalkyl with 1 to 5 carbon atoms, lower alkylated aminoalkyl with 2 to 8 carbon atoms, amino, or lower alkylated amino; or $R_1$ and $R_2$ together with N form 1 - pyrrolidinyl, piperidino, morpholino, thiomorpholino, 1-piperazinyl, 4-(lower alkyl)-1-piperazinyl, 4-(lower hydroxyalkyl)-1-piperazinyl and 4-(lower alkoxy-lower alkyl)-1-piperazinyl; and $R_3$, $R_4$ and $R_5$ are the same or different and denote hydrogen, halogen, hydroxy, trifluoromethyl, lower alkyl, lower alkoxy or lower alkylthio; the term "lower" meaning that the corresponding alkyl, alkoxy, etc., residues contain from 1 to 3 carbon atoms.

A further object of the invention is to provide 11-basic substituted dibenzo[b,e][1,4]diazepines and dibenzo[b,f][1,4]thiazepines having the above-mentioned actions of the general formula:

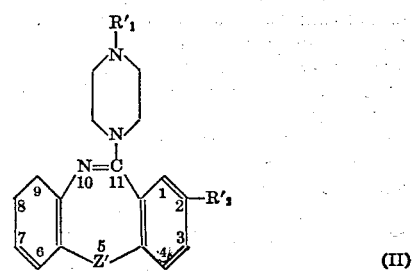

(II)

and acid addition salts thereof. In Formula II Z' denotes sulfur, sulphinyl (—SO—) or imino (—NH—), $R'_1$ reprents hydrogen, allyl, alkyl containing not more than 3 carbon atoms, hydroxyalkyl containing not more than 3 carbon atoms, alkoxyalkyl containing not more than 6 carbon atoms or alkoyloxyalkyl containing not more than 6 carbon atoms. $R'_2$ denotes nitro; amino; aminosulphonyl of the formula —$SO_2NR'_3R'_4$, wherein $R'_3$ and $R'_4$ are the same or different and represent hydorgen or methyl; alkylsulphinyl of the formula —$SOR'_5$, wherein $R'_5$ denotes alkyl with not more than 3 carbon atoms; or alkylsulphonyl of the formula —$SO_2R'_5$, in which $R'_5$ represents alkyl with not more than 3 carbon atoms.

The compounds of Formula I are obtained by treating a reaction mixture containing nitrilium of imonium cations of the general formulae:

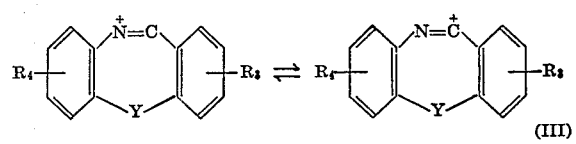

(III)

wherein Y denotes bivalent sulfur, lower alkyl imino, or acyl imine, and $R_3$ and $R_4$ have the meaning stated above; with ammonia or an amine of the formula $NHR_1R_2$, wherein $R_1$ and $R_2$ have the meaning stated above, and subsequently splitting off a protecting acyl residue.

The starting reaction mixture containing the cations of Formula III is, for instance, obtained from compounds of the formula:

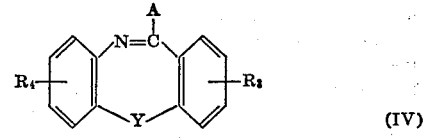

(IV)

wherein Y, $R_3$ and $R_4$ have the meaning stated above, and wherein A represents halogen, lower alkoxy, lower alkylthio or p-nitrobenzylthio. The latter compounds, in turn, can be prepared by thermal cyclization of o-aminodiphenylamino-o'-carboxylic acids to form lactams of the formula:

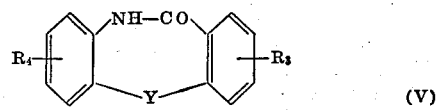

(V)

and by treatment thereof wtih a halogenizing agent, such as phosphoroxychloride, phosphorus pentachloride or a mixture thereof, preferably in the presence of a catalytic amount of dimethylaniline or dimethylformamide, or by treatment of the lactams (V) with phosphorus pentasulfide to build the corresponding thiolactams, whose tautomeric from can be alkylated to build the imido thio ethers. In accordance with this finding, it is not necessary to isolate the imido compounds of Formula IV, which in part are not stable, as intermedaite compounds, but the reaction with the amine having the formula $HNR_1R_2$ can directly be performed using the reaction mixture which contains the nitrilium or imonium cations of Formula III.

The cations of Formula III can further be prepared, for example, by intramolecular Ritter reaction (reaction of the nitrile radical with a phenyl cation) from o-cyanodiphenylamines or o-cyanodiphenylsulfides, by Beckmann's rearrangement of acridone oxime or thioxanthone oxime, which may be suitably substituted or by Schmidt reaction of acridone or thioxanthone, which may be substituted, with hydrazoic acid. Starting with unsymmetrically substituted oximes or ketones, Beckmann's rearrangement and the Schmidt reaction, however, yield mixtures of isomers, which subsequently must be separated, if necessary.

The compounds of Formula I are also obtained by exposing an urea derivative corresponding to the formula:

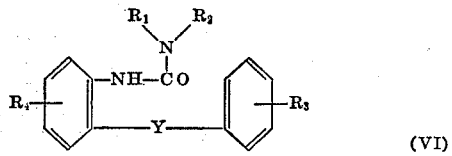

(VI)

wherein Y, $R_1$, $R_2$, $R_3$ and $R_4$ have the meaning stated above, to dehydrating conditions, e.g. through several hours' action by dehydrating agents, such as zinc dichloride, aluminium chloride, tin tetrachloride, phosphoric acid and the like, if required in the presence of an inert solvent of suitable boiling point, such as benzene, toluene, etc., but preferably through heating with phosphoroxychloride in toluene in accordance with the Bischler-Napieralski reaction. Those products (I) in which Z is imino are obtained by this process, setting out from corresponding compounds wherein Y is acyl imino, by splitting off the acyl residue after successful ring closure.

Products of Formula I are further obtained by ring closure by intramolecular condensation of acid amides or acid thio amides having the formula:

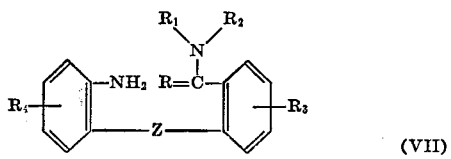

(VII)

wherein R denotes oxygen or sulfur, and Z, $R_1$, $R_2$, $R_3$ and $R_4$ have the meaning stated above. A purely thermal condensation is, in general, not possible with the acid amides— which, in turn, are obtainable, for instance, by reduction of the corresponding nitro compounds—but rather with the acid thio amides, which can, for instance, be prepared by treatment of the acid amides with phosphorus pentasulfide, and which must not necessarily be isolated in order to be used in the subsequent condensation step. Especially when starting with the acid amides, the reaction will suitably be performed in the presence of condensation agents, such as phosphorus pentachloride, phosphoroxychloride, phosgene, polyphosphoric acid and so on. It is to be assumed that ring closure occurs over intermediate compounds, such as imide chlorides, amide chlorides, imido phosphates, amido phosphates and salt-like derivatives thereof, which in general cannot be isolated. The condensation of the acid thio amides may be favored by the presence of mercury salts or by formation of intermediate imido thio ethers, which may be activated. Heating and use of an inert diluent are indicated, and, when working with phosphoroxychloride and phosphorus pentachloride, also addition of catalytic amounts of dimethylaniline or dimethylformamide.

Insofar as, by these reactions, compounds of Formula I are obtained, wherein $R_1$ and/or $R_2$ denote hydrogen, radicals $R_1$ and/or $R_2$ other than hydrogen may subsequently be introduced, if desired, by reaction of the amines obtained with reactive esters of alcohols having the formulae $R_1$—OH or $R_2$—OH, respectively, preferably with esters of halohydric acids, sulfuric acid or toluene sulphonic acid, if desired after previous or with simultaneous action of a basic catalyst of metallizing agent, such as sodium amide, lithium amide, sodium hydride, butyl lithium, phenyl sodium, sodium ethylate, or potassium t-butylate.

In the same way, a lower alkyl residue may be subsequently introduced in the 5-position of reaction products wherein Z denotes imino, by reacting them with a reactive ester of lower alkanols, preferably after previous or with simultaneous action of a basic catalyst or metallizing agent.

On the other hand, in order to obtain products of Formula I, wherein Z denotes imino, a cleavable protecting residue occurring in the Y unit of the starting material, can be split off after ring closure in known manner, for instance, by subjecting a 5-acetyl or 5-benzoyl derivative to selective hydrolysis, or by subjecting a 5-carbobenzoxy derivative to hydrogenolysis.

Compounds of Formula II are obtained when a compound of the formula:

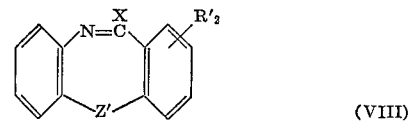

(VIII)

wherein Z' and $R'_2$ have the meaning defined above and X denotes a residue capable of being split off with the hydrogen of amines, is reacted with piperazine or a piperazine derivative, respectively, of the formula:

(IX)

wherein $R'_1$ has the above-mentioned meaning.

A residue capable of being split off with the hydrogen of amines, which can be bound ionically or covalently to the carbon atom, can most conveniently be represented by halogen, sulphydryl, or alkoxy and alkylthio which may be activated, e.g., methoxy, thiomethyl or p-nitrobenzylthio, or by tosyl.

Starting materials of the Formula VIII are obtained by converting lactams of the formula:

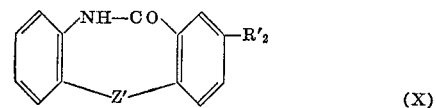

(X)

wherein Z' and $R'_2$ have the meaning given above, into the thiolactams which may be followed by alkylation, or by reaction of the lactams with a halogenating agent such as phosphorus oxychloride or phosphorus pentachloride, most suitably in the presence of a catalytic amount of dimethylaniline or dimethylformamide. Lactams of Formula X are themselves obtained by ring closure of compounds of the formula:

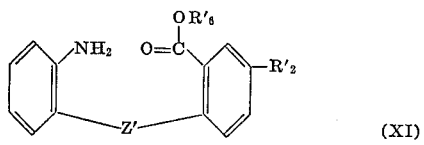

(XI)

wherein Z' and $R'_2$ have the above-mentioned meaning and $R'_6$ denotes hydrogen or lower alkyl. For products wherein Z' represents —S—, lactams of Formula X may also be obtained by ring closure of a compound of the formula:

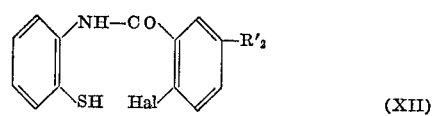

(XII)

wherein Hal stands for halogen, or of isocyanates of the formula:

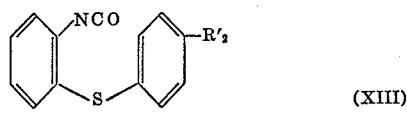

(XIII)

Lactams of Formula X in which R'$_2$ represents amino are most suitably obtained by reduction of the corresponding nitrolactams.

Compounds of Formula II may further be obtained by ring closure through intramolecular condensation of acid amides or acid thioamides of the formula:

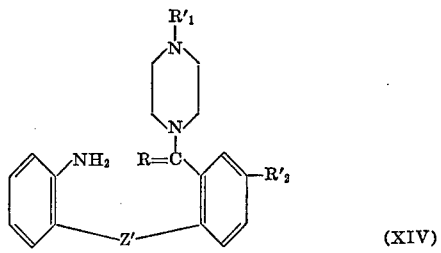

(XIV)

wherein Z', R'$_1$ and R'$_2$ have the above-mentioned meaning and R represents oxygen or sulfur. A purely thermal condensation rarely succeeds with the acid amides but rather with the thioamides which are, for example, obtained from the acid amides by treatment with phosphorus pentasulphide and need not be isolated before the following condensation. Especially in the case of the acid amides it is desirable to perform the ring closure in the presence of condensing agents, such as phosphorus pentachloride, phosphorus oxychloride, phosgene, polyphosphoric acid, and the like. It is assumed that the ring closure proceeds by way of intermediate steps such as imidochlorides, amidochlorides, imidophosphates, amidophosphates or salt-like derivatives thereof, which, in general, are not isolatable. The condensation of the thioamides is favoured by the presence of mercury(II)salts or by intermediate formation of imidothioethers which may be activated. Heating and, if required, the use of a suitable inert solvent are desirable, and when using phosphorus oxychloride and phosphorus pentachloride addition of catalytic amounts of dimethylformamide or dimethylaniline.

11-basic substituted dibenzo[b,f][1,4]thiazepines (Formula I: Z'=—S—) can also be obtained by dehydration of urea derivatives of the formula:

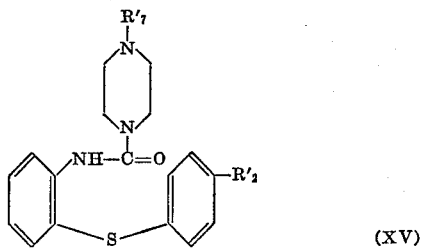

(XV)

wherein R'$_2$ has the above-mentioned meaning and R'$_7$ means R'$_1$ or denotes a removable group, especially a hydrolytically removable group. The ring closure is preferably carried out by heating in the presence of dehydrating agents such as zinc chloride, aluminum chloride, stannic chloride, phosphoric acid, polyphosphoric acid and the like, especially phosphorus oxychloride or phosphorus oxychloride and phosphorus pentoxide, if desired in an inert solvent of suitable boiling point such as benzene or toluene etc. According to the chosen reaction conditions the starting materials of Formula XV with a hydrolytically removable group R'$_7$, e.g. carbalkoxy, especially carbethoxy, are cyclicized directly to the 11-(1-piperazinyl) compounds by hydrolysis of the removable group. Other removable groups can be split off after ring closure in a way known per se, e.g. by hydrogenolysis.

As long as R'$_2$ does not denote amino, the compounds of Formula II can also be obtained when amidines of the formula:

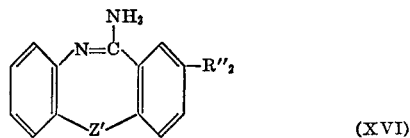

(XVI)

wherein Z' has the above-mentioned meaning and R''$_2$ represents R'$_2$ with exclusion of amino, are treated with a reactive ester of an alcohol of the formula:

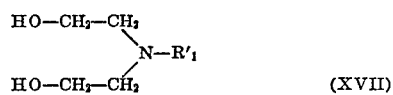

(XVII)

wherein R'$_1$ has the above-mentioned meaning. The reaction is carried out following or by simultaneous treatment with a basic catalyst or metallization agent such as sodamide, lithium amide, sodium hydride, butyl lithium, phenyl sodium, sodium ethylate or potassium-t-butoxide. Suitable esters are those of inorganic or organic acids, e.g., hydrohalic acid, sulphonic acid or carbonic acid esters. The required amidines XVI are in turn obtained by treating compounds of Formula VIII with ammonia.

On the other hand, compounds of Formula II, wherein R'$_2$ is amino, may be obtained by reduction of the corresponding nitro compounds. The reduction is most suitably carried out by treatment with hydrogen in the presence of a catalyst such as palladium charcoal or Raney nickel or by treatment with stannous chloride and hydrochloric acid.

Compounds of Formula II, wherein Z' denotes sulphinyl, are also obtained by oxidation, e.g. with periodates, of the corresponding compounds in which Z' represents sulfur.

Compounds of Formula II, wherein R'$_2$ represents alkylsulphinyl or alkylsulphonyl, respectively, can also be obtained by mild (e.g. with periodates) or strong (e.g. with hydrogen peroxide or peracetic acid) oxidation of the corresponding alkylthio compounds. Products wherein R'$_2$ represents alkylsulphonyl are also obtainable by strong oxidation of the corresponding alkylsulphinyl compounds. If the oxidation is carried out on the dibenzo [b,f][1,4]thiazepines (Z'=—S—) then, according to the type of oxidizing agent used, the corresponding thiazepine sulphoxides (Z'=—SO—) are obtained.

Finally, compounds of Formula II, wherein R'$_2$ denotes aminosulphonyl of the formula —SO$_2$NR'$_3$R'$_4$, are obtained when the corresponding compounds containing the group —SO$_2$X instead of aminosulphonyl, wherein X denotes a residue which is removable with the hydrogen of amines, especially halogen, are reacted with ammonia or an amine of the formula HNR'$_3$R'$_4$, wherein R'$_3$ and R'$_4$ have the above defined meaning. Starting materials containing a sulphochloride group (—SO$_2$Cl) are obtained by diazotization of the corresponding amino compounds followed by the Meerwein reaction.

Compounds of Formula II, obtained according to one of these methods, wherein R'$_1$ represents hydrogen can be converted to such compounds wherein R'$_1$ does not represent hydrogen, e.g. by treatment with reactive esters of alcohols of the formula R'$_1$—OH. Hydrohalic acid or toluenesulphonic acid esters are suitable for this purpose. An alkyl group R'$_1$ can also be introduced by the method of reductive alkylation, i.e., by reaction with corresponding aldehydes either with hydrogen in the presence of a catalyst or with a reducing agent such as formic acid. The introduction of a hydroxyalkyl group R'$_1$ can also be carried out by treating with a corresponding alkylene oxide.

Compounds of Formula II in which $R'_1$ denotes a hydroxyalkyl group can be subsequently treated with an acylating agent to obtain products wherein $R'_1$ represents an alkoyloxyalkyl group. Acid chlorides and acid anhydrides are especially suitable as acylating agents.

Subsequent introduction of a group $R'_1$, other than hydrogen, and also subsequent acylation of a hydroxyalkyl group $R'_1$ can lead to additional substitution in products in which $R'_2$ denotes an amino group; this amino group being additionally substituted.

The bases I or II obtained in this manner are in most cases crystallizable or can otherwise be distilled in high vacuum without decomposition and react with inorganic and organic acids such as hydrochloric acid, hydrobromic acid, sulphuric acid, nitric acid, phosphoric acid, acetic acid, maleic acid, succinic acid, tartaric acid, toluene sulphonic acid and the like to form addition salts which are stable in water, in which form the products may also be used.

Two bases I and II as well as their acid addition salts are new compounds which can be used as active substances in pharmaceuticals.

The 8-chloro-11-(4-methyl - 1 - piperazinyl)-5H-dibenzo[b,c][1,4]diazepine obtained according to Example 13 shows in animal experimentation two properties of a neuroplegic with intense analgesic, sedative, parasympatholytic and sympatholytic action. The analgesic action is determined by measuring the pain threshold during electrical stimulation of the dental pulp in the rabbit. It is compared in Table I below with the action of known analgesics.

TABLE I

| Substance | Dose, i.v., mg./kg. | Threshold current in— Percent of the control values | μamp | Duration of the effects (hrs.) |
|---|---|---|---|---|
| 8-chloro-11-(4-methyl-1-piperazinyl)-5H-dibenzo[b,e][1,4]diazepine | 4.6 | 286 | 280 | 3.5 |
| Codeine | 7 | 231 | 160 | 2 |
| d-Propoxyphene | 4 | 313 | 220 | 1.5 |
| Morphine | 3 | 300 | 250 | 3.5 |

The sedative and motility depressing effect may be seen from the moving activity test according to Caviezel and Baillod [Pharm. Acta Helv. 33, 469 (1968)] in the mouse. In this test, the ED 50% in mg./kg. p.o. amounts to 2.5. Comparative figures will be seen in Table II below.

The 2-chloro-11-(4-methyl - 1 - piperazinyl)-dibenzo [b,f][1,4]thiazepine obtained according to Example 14 shows in animal experimentation, the properties of a neuroleptic agent with intense motility depressing action and antagonistic effect to apomorphine. The motility depressing action was determined by measuring the moving activity in the mouse in accordance with the method of Caviezel and Baillod [Pharm. Acta Helv. 33, 469 (1958)], as well as by the open-field test in the rat according to the method of Janssen et al. [Psychopharmacologia 1, 389 (1960)], using 10 animals in each test. In Table II below, the average values obtained are compared with the corresponding data of known neuroleptics. Furthermore, Table II shows comparative data for the acute toxicity in the mouse as well as for cataleptic action. The latter was tested in rats, which, in several intervals after s.c. injection of divers amounts of active substance, were put with both front paws on a column of 7 cm. in altitude, measuring the duration of persistence of the animal in this unnatural position. The figures given in this Table II correspond to the graphically obtained amounts of active substance, which, in the average of 10 animals, resulted in a perseverence time of 30 seconds.

TABLE II

| Substance | Toxicity, $LD_{50}$, mouse, mg./kg., p.o. | Moving activity, $ED_{50}$ percent, mg./kg., p.o. | Open-field test, $ED_{50}$ percent, mg./kg., p.o. | Catalepsy, $ED_{30}$ sec., mg./kg., s.c. |
|---|---|---|---|---|
| 2-chloro-11-(4-methyl-1-piperazinyl)-dibenzo-[b,f][1,4]thiazepine | 270 | 0.6 | 0.23 | 0.72 |
| Haloperidol | 125 | 0.3 | 3.4 | 0.23 |
| Perphenazine | 120 | 1.0 | 5.0 | 0.24 |
| Chloropromazine | 135 | 3.5 | 4.9 | 3.8 |

Compounds of Formula II in which $R'_2$ denotes nitro show also the typical behaviour pattern for neuroleptics. As mentioned above, this manifests pharmacologically, e.g., in a suppression of locomotor activity, a cataleptic and/or an apomorphine antagonising effect in mice or rats, respectively. The most effective compounds in this respect are 2-nitro-11-(4-methyl-1-piperazinyl)-dibenzo-[b,f][1,4]thiazepine, obtained according to Example 95, as well as its acid addition salts.

Certain compounds of Formulae I and II, especially those with 11-(1-piperazinyl) residues show simultaneously the behaviour pattern for neuroleptics and antidepressants whereby the antidepressant action is shown pharmacologically by a tetrabenazine antagonism observed in rats. Especially active in this respect are 2-nitro-11 - (1-piperazinyl)-dibenzo[b,f][1,4]thiazepine obtained according to Example 101 and its acid addition salts.

Compounds of Formula II in which $R'_2$ represents aminosulphonyl or alkylsulphonyl exhibit a marked antiemetic activity. This is shown pharmacologically by a strong apomorphine antagonising effect in dogs and rats as well as a comparatively weak cataleptic and locomotor activity suppressing effect.

Pronounced antiemetic activity is shown by 2-dimethylaminosulphonyl - 11 - (4-methyl-1-piperazinyl)-dibenzo-[b,f][1,4]thiazepine and 2-methylsulphonyl-11-(4-methyl - 1 - piperazinyl)-dibenzo[b,f][1,4]thiazepine obtained according to Examples 96 or 105, respectively, and their acid addition salts.

To further illustrate the pharmacological activity and the dosage levels in which the compounds of the present invention are used to provide an indicated pharmacological analgesic activity, the following data are given in Table III:

TABLE III

| Product of Example No.: | Toxicity (mouse), $LD_{50}$, mg./kg., i.v. | Dose, mg./kg., i.v. | Threshold current (in percent of the control values) |
|---|---|---|---|
| 3 | 50 | 1.75 | 467 |
| 9 | 26 | 2.0 | 255 |
| 12 | 48 | 7.0 | 247 |
| 13 | 64 | 0.45 | 350 |
| 14 | 52 | 2.5 | 202 |
| 20 | 145 | 21.0 | 254 |
| 22 | 18 | 2.0 | 230 |
| 24 | 24 | 3.5 | 426 |
| 26 | 34 | 5.0 | 276 |
| 29 | 25.5 | 3.5 | 274 |
| 33 | 60 | 5.0 | 394 |
| 34 | 27 | 4.0 | 860 |
| 35 | 147 | 5.0 | 417 |
| 37 | 41 | 6.0 | 374 |
| 38 | 37 | 5.0 | 446 |
| 40 | 40.5 | 1.5 | 207 |
| 49 | 9.2 | 0.65 | 315 |
| 70 | 80 | 5.0 | 224 |
| 82 | 40 | 5.5 | 302 |

Table IV gives data on compounds which exhibit sedative and motility depressing action, as determined in accordance with the details stated in columns 8 and 9.

TABLE IV

| Product of Example No.: | Toxicity (mouse), $LD_{max.}$, mg./kg., p.o. | Moving activity, $ED_{50}$ percent, mg./kg., p.o. |
|---|---|---|
| 3 | 760 | 7.0 |
| 9 | 1,140 | 40.0 |
| 13 | 340 | 2.5 |
| 14 | 380 | 0.6 |
| 22 | 760 | 50.0 |
| 24 | 100 | 10.0 |
| 27 | 1,100 | 20.0 |
| 33 | 680 | 20.0 |
| 35 | 316 | 10.0 |
| 37 | 285 | 15.0 |
| 38 | 680 | 30.0 |
| 47 | 330 | 24.0 |
| 49 | 32 | 3.0 |
| 62 | 2,000 | 12.5 |
| 70 | 1,000 | 20.0 |
| 76 | 2,000 | 1.5 |
| 82 | 500 | 0.5 |
| 84 | 1,000 | 0.9 |
| 85 | 500 | 2.5 |
| 86 | 1,000 | 16.0 |
| 88 | 1,000 | 1.4 |
| 93 | 1,000 | 20.0 |
| 94 | 350 | 27.0 |

Table V gives data on compounds which exhibit parasympatholytic action. This action is determined by the property of such substances to reduce or annul the hypotensive action which is otherwise observed in the narcotized cat upon electric stimulation of the Vagus nerve or upon administration of acetylcholine (ACH). In Table V those doses of inventive products are shown which cause 75% reduction of the hypotensive action of Vagus stimulation and ACH, respectively:

TABLE V

| Parasympatholytic product of Example No.: | Toxicity (mouse), $LD_{50}$, mg./kg., i.v. | Parasympatholytic action, ED 75%, mg./kg., i.v. | |
|---|---|---|---|
| | | Vagus stimulation | Upon ACH |
| 2 | 49 | 2.0 | 2.0 |
| 3 | 50 | 2.0 | 5.0 |
| 5 | 67 | 2.0 | 10.0 |
| 9 | 26 | 0.5 | 2.0 |
| 11 | 23 | 1.0 | 5.0 |
| 13 | 64 | 1.0 | 10.0 |
| 23 | 55 | 1.0 | 5.0 |
| 26 | 34 | 0.5 | 1.0 |
| 32 | 54 | 1.0 | 5.0 |
| 33 | 60 | 1.0 | 2.0 |
| 36 | 21 | 0.5 | 2.0 |
| 60 | 35 | 1.0 | 2.0 |
| 64 | 12 | 0.5 | 1.0 |

Table VI gives data on compounds which exhibit antihistaminic action. The antihistaminic action is determined by the standard histamine asthma-test in the guinea pig. Upon p.o. administration of the test compound, the animals are put in an atmosphere containing histamine aerosol. In the following Table VI those doses of inventive products are shown which protect 50% of the animals completely against histamine asthma during at least 10 minutes (ED 50):

TABLE VI

| Antihistaminic product of Example No.: | Toxicity (mouse), $LD_{50}$, mg./kg., p.o. | Histamine prophylaxis, $ED_{50}$, mg./kg., p.o. |
|---|---|---|
| 2 | 1,000 | 0.5 |
| 3 | 760 | 3.0 |
| 9 | 145 | 1.7 |
| 13 | 340 | 3.6 |
| 22 | 760 | 1.4 |
| 34 | 215 | 0.15 |
| 35 | 316 | 2.6 |
| 38 | 680 | 0.6 |
| 44 | 200 | 0.15 |
| 62 | 2,000 | 0.07 |
| 64 | 2,000 | 0.9 |
| 74 | 1,000 | 0.35 |
| 82 | 500 | 0.14 |

The compounds of this invention can be administered in the form of pharmaceutical preparations containing, besides the active substance, organic or inorganic solid or liquid carriers suitable for enteral or parenteral administration. The pharmaceutical preparations may be, for example, in the form of tablets, dragees, or solutions for injection.

EXAMPLE 1

A 10.0 g. quantity of 5-methyl-7-methylthio-10,11-dihydro-11-oxo-5H-dibenzo[b,e][1,4]diazepine is heated under reflux conditions during 1 hour with 10 g. of phosphorus pentachloride in 350 ml. of dry chloroform. The yellow-red solution is concentrated to dryness in vacuo. The residue is heated under reflux for 3 hours with 38 ml. of N-methylpiperazine in 160 ml. of absolute dioxane. Upon concentration in vacuo of the dioxane solution as far as possible, the residue is distributed between diluted soda lye and benzene. The biphasic solution is separated from undissolved substance by filtration. After washing of the benzenic phase with water, the alkaline material is extracted by shaking with diluted acetic acid, freed by addition of ammonia and dissolved in benzene. The benzenic phase is washed with water, dried over sodium sulfate and concentrated. After clarifying with alumina, the residual solvent is evaporated. The residue crystallizes spontaneously from ether and, after recrystallization from acetone/petroleum ether, yields 6.9 g. (52% of the theoretical amount) of 5-methyl-7-methylthio-11-(4-methyl-1-piperazinyl)-5H-dibenzo(b,e][1,4]diazepine in the form of yellow prisms, having a melting point of 171–173° C.

EXAMPLE 2

8.4 g. of 3-methyl-10,11-dihydro-11-oxo-dibenzo[b,f][1,4]thiazepine are heated for 2 hours under reflux with 9 g. of phosphorus pentachloride in 120 ml. of dry chloroform. Upon evaporation to dryness in vacuo, 30 ml. of N-methylpiperazine are slowly added; then heating under reflux is continued for further 3 hours. The reaction mixture is worked up as in Example 1, with the exception that ether is used in place of benzene in the extraction step. The 3-methyl-11-(4-methyl-1-piperazinyl)-dibenzo[b,f][1,4]thiazepine distills at 178° C./0.02 mm. Hg and can be crystallized from ether/petroleum ether. The yield is 6.9 g. (61% of the theoretical) of faint yellow prisms having a melting point of 92–95° C.

EXAMPLE 3

A solution of 9.6 g. of 5-methyl-8-chloro-10,11-dihydro-11-oxo-5H-dibenzo[b,e][1,4]diazepine in 75 ml. of phosphoroxychloride, containing 3 ml. of dimethylaniline, is heated for 2 hours under reflux. The dry residue obtained upon evaporation of the reaction mixture in vacuo, is mixed with 50 ml. of N-methylpiperazine in 40 ml. of dioxane and heated under reflux for 4 hours. Working up of the reaction mixture as in Example 2 yields 8.1 g. (66% of the theoretical amount) of 5-methyl-8-chloro-11-(4-methyl - 1 - piperazinyl)-5H-dibenzo[b,e][1,4]diazepine in the form of reddish-yellow plates of melting point 164–165° C. (from ether/petroleum ether).

EXAMPLE 4

11.8 g. of 10,11-dihydro-11-oxo-5H-dibenzo[b,e][1,4] diazepine, 0.4 ml. of dimethylformamide and 8.6 g. of phosphoroxychloride in 120 ml. of dry chloroform are agitated during 2 hours under reflux conditions. Upon concentration of the reaction mixture to dryness in vacuo, the residue is heated under reflux for 4 hours with 30 ml. of absolute dioxane and 30 ml. of piperidine. The reaction mixture is worked up in the same manner as in Example 2, with the exception that diluted hydrochloric acid is used in place of acetic acid for isolating the base. 6.1 g. (39% of the theoretical yield) of 11-piperidino-5H-dibenzo[b,e][1,4]diazepine are obtained in the form of yellow plates of melting point 129–131° C. (from ether/petroleum ether).

EXAMPLE 5

The reaction mixture obtained from 0.7 g. of potassium and 15 ml. of tertiary butanol is mixed with 4.4 g. of 7-chloro-11 - mercapto - 5H - dibenzo[b,e][1,4]diazepine in 50 ml. of dioxane and heated for 1 hour under reflux. Upon cooling, a solution of 3.5 g. of n-nitrobenzylchloride in 10 ml. of dioxane is added drop by drop with agitation, and the mixture is again refluxed during 2 hours and then concentrated to dryness in vacuo. The residue is distributed between water and chloroform. The chloroformic solution is washed with diluted soda lye and water, dried over sodium sulfate and concentrated. Upon addition of petroleum ether, 7-chloro-11-p-nitrobenzylmercapto-5H-dibenzo[b,e][1,4]diazepine crystallizes in an amount corresponding to 79% of the theoretical yield. After recrystallization from acetone/petroleum ether the product has a melting point of 178–182° C.

A solution of 4.6 g. of this product in 10 ml. of N-methyl-piperazine, containing 3 drops of glacial acetic acid, is heated during 24 hours under reflux. The reaction mixture is concentrated to dryness in vacuo. The residue is distributed between ether and ammonia/water. The ethereal solution is washed with water and extracted with 1-n. acetic acid. The acid extract is clarified with charcoal, mixed with concentrated ammonia solution and saturated with sodium chloride. The alkaline precipitate is separated by filtration and recrystallized from acetone/petroleum ether. 3.2 g. (85% of the theoretical yield) of 7-chloro - 11 - (4-methyl-1-piperazinyl)-5H-dibenzo-[b,e][1,4]diazepine are obtained, having a melting point of 179–181° C.

EXAMPLE 6

A 7.05 g. quantity of N-methyl-o-ureido-diphenylamine is boiled under reflux conditions for 3 hours with 15 ml. of phosphoroxychloride in 140 ml. of absolute toluene, whereupon a yellowish-red, syrupy product separates out. After evaporating the solvent, the residue is decomposed with diluted ammonia solution, the organic substance which forms as a viscous oil is dissolved in chloroform, and the chloroform extract is washed with water, dried over sodium sulfate and evaporated. As residue, there are obtained 6.58 gm. of a yellow resinous product which solidifies with foam in vacuum and most of which on distribution between ether and diluted hydrochloric acid passes into the acid layer. From the hydrochloric acid extract, the base is liberated with ammonia, separated by suction and washed with water. After drying, the product is recrystallized from acetone/petroleum ether to provide a yield of 4.2 gm. (61% of the theoretical) of yellow 5 - methyl - 11 - amino - 5H - dibenzo[b,e][1,4]diazepine having a melting point 167–168° C.

The N-methyl-o-ureido-diphenylamine used as the starting material can be obtained in the form of needles having a melting point of 180–183° C., in a yield of 90%, by introducing, while cooling, potassium cyanate in slight excess into an acetic solution of N-methyl-o-amino-diphenylamine and by aspirating the precipitate which forms after diluting with water and allowing the whole to stand, by washing with diluted hydrochloric acid and water and by recrystallizing from acetone/water.

Identical products as in Example 6 are obtained, in some cases however in poor yields, by using phosphoric acid, aluminium chloride or zinc chloride as condensing agents.

EXAMPLE 7

By proceeding in the same way as in Example 6, but using o-piperidylamido-diphenylsulfide as the starting material and leaving out the toluene solvent, there is obtained 11-piperidine-dibenzo[b,f][1,4]thiazepine, melting point 133–134° C., in a yield of 12% of the theoretical.

EXAMPLE 8

A 3.5 g. quantity of 11-chloro-dibenzo[b,f][1,4]thiazepine is dissolved in 40 ml. of absolute xylol, mixed with 4.3 gm. of piperidine and heated for 5 hours under reflux conditions. The reaction mixture is diluted with water and made alkaline with concentrated sodium hydroxide solution. The xylol layer is separated, washed until neutral with water and extracted with hydrochloric acid. The acid extracts are made alkaline with concentrated ammonia solution and the precipitated oil extracted with ether. The ethereal solution is washed with water and evaporated. The residue is crystallized from ether/petroleum ether. A yield of 3.4 gm. of 11-piperidino-dibenzo-[b,f][1,4]thiazepine is obtained having a melting point of 133–134° C., which is identical with the product of Example 7.

EXAMPLE 9

By proceeding as in Example 8 but setting out from imido thio ether and N-methyl-piperazine and using a trace of glacial acetic acid as the catalyst, there is obtained 11 - (4-methyl-1-piperazinyl)-5H-dibenzo[b,f][1,4] diazepine having a meting point of 184–185° C. (from acetone/petroleum ether) in a yield of 87% of the theoretical.

EXAMPLE 10

A mixture of 6.2 g. of N - methyl - 2 - aminodiphenylamine-2'-carboxylic acid piperidide, 6.0 g. of phosphorus pentasulfide and 60 ml. of pyridine is heated during 4 hours under reflux. The reaction mixture is evaporated to dryness in vacuo. 150 ml. of 2-n. aqueous soda solution are added to the residue, and after a certain time the yellow crystalline precipitate is taken into benzene. The benzenic solution is extracted with 2-n. hydrochloric acid. The acid extract is clarified with charcoal and treated with concentrated ammonia water to precipitate the alkaline substance, which is dissolved in ether. The ethereal solution is washed with water and dried over sodium sulfate. The residue obtained yields, after recrystallization from ether/petroleum ether, 3.4 g. (57% of the theoretical amount) of 5-methyl-11-piperidine-5H-dibenzo[b,e][1,4] diazepine in the form of lemon-colored grains having a melting point of 162–163° C.

EXAMPLE 11

6.2 g. of N - methyl - 2 - aminodiphenylamine-2'-carboxylic acid (β-dimethylamino)ethylamide and 6 g. of phosphorus pentasulfide in 60 ml. of pyridine are heated during 4 hours under reflux. The reaction mixture is worked up as in Example 10, however, the extraction is performed using diluted acetic acid in place of hydrochloric acid. 3.5 g. (59% of the theoretical yield) of 5-methyl - 11 - (β - dimethylamino - ethylamino)-5H-dibenzo[b,e][1,4]diazepine are obtained in the form of yellow plates having a melting point of 167–170° C. (from acetone/petroleum ether).

EXAMPLE 12

6.0 g. of 2-aminodiphenylamine - 2' - carboxylic acid (β-dimethylamino)ethylamide are triturated during 1½ hours with 60 g. of polyphosphoric acid (average degree of polymerization=3.4) at 150° C. Ice and concentrated aqueous ammonia solution are added to the homogeneous syrupy reaction mixture until it is alkaline. The precipitate is dissolved in ether. Extraction of the base and further purification are performed as in Example 11. 2.0 g. (35% of the theoretical yield) of 11-(β-dimethylaminoethylamino) - 5H - dibenzo[b,e][1,4]diazepine are obtained in the form of light yellow grains having a melting point of 143–144° C. (from ether/petroleum ether).

EXAMPLE 13

7.4 g. of 2-amino-4-chlorodiphenylamine-2'-carboxylic acid (4''-methyl)piperazide and 35 ml. of phosphoroxychloride are heated for 3 hours under reflux in the presence of 1.4 ml. of N,N-dimethylaniline. Upon concentration of the reaction mixture in vacuo as far as possible, the residue is distributed between benzene and ammonia/ice water. The separation and purification of the basic component is performed as in Example 11. 2.9 g. (41% of the theoretical yield) of 8-chloro-11-(4-methyl-1-piperazinyl)-5H-dibenzo[b,e,][1,4]diazepine are obtained in the form of yellow grains of melting point 182–184° C. (from acetone/petroleum ether).

EXAMPLE 14

6.8 g. of 2-amino-4'-chlorodiphenylsulfide-2'-carboxylic acid (4''-methyl)piperazide are heated for 1 hour under reflux with 7 g. of phosphorus pentachloride in 35 ml. of phosphoroxychloride, in the presence of 10 drops of dimethylformamide. The residue obtained by evaporation of the reaction mixture in vacuo is worked up as in Example 12. 2.7 g. (42% of the theoretical yield) of 2-chloro - 11 - (4 - methyl - 1 - piperazinyl)-dibenzo[b,f][1,4]thiazepine are obtained in the form of faint yellow grains of melting point 118–120° C. (from ether/petroleum ether).

In like manner as in Examples 1 to 14, there are obtained from the corresponding starting materials the products listed in the following Table VII. Therein $R_1$, $R_2$, $R_3$, $R_4$ and Z denote the corresponding residues of Formula I. In the last column, "e" means ether, "pe" petroleum ether, and "ac" acetone.

TABLE VII

| Example | Z | $R_3$ or $R_4$ | $-N\langle{}^{R_1}_{R_2}$ | M.P. or *B.P. of the base, °C. |
|---|---|---|---|---|
| 15 | $-\underset{H}{N}-$ | H | $-N(C_2H_5)_2$ | (¹). |
| 16 | $-\underset{H}{N}-$ | H |  | 201–203 (from ac/pe). |
| 17 | $-\underset{H}{N}-$ | H | $-NH-CH_2-CH_2-N(C_2H_5)_2$ | *205–210 (0.01 mm. Hg).² |
| 18 | $-\underset{H}{N}-$ | H | $-NH-CH_2-CH_2-CH_2-N(CH_3)_2$ | 148–150 (from e/pe). |
| 19 | $-\underset{H}{N}-$ | H | $-NH-\underset{CH_3}{CH}-(CH_2)_3-N(CH_3)_2$ | *204–208 (0.05 mm. Hg).³ |
| 20 | $-\underset{H}{N}-$ | H |  | 182–184 (from ac/pe). |
| 21 | $-\underset{CH_3}{N}-$ | H | $-NH-CH_2-CH_2-CH_2-N(CH_3)_2$ | 73–75 (from e/pe). |
| 22 | $-\underset{CH_3}{N}-$ | H |  | 124–125 (from e/pe). |
| 23 | $-\underset{H}{N}-$ | 2-OCH₃ | $-NH-CH_2-CH_2-N(CH_3)_2$ | (⁴). |
| 24 | $-\underset{H}{N}-$ | 2-OCH₃ |  | (⁵). |
| 25 | $-\underset{H}{N}-$ | 8-OCH₃ | $-NH-CH_2-CH_2-N(CH_3)_2$ | (⁶). |
| 26 | $-\underset{CH_3}{N}-$ | 7-Cl | $-NH-CH_2-CH_2-N(CH_3)_2$ | 155–156 (from e/pe). |
| 27 | $-\underset{CH_3}{N}-$ | 7-Cl | 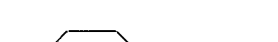 | 201–203 (from ac/H₂O). |
| 28 | $-\underset{H}{N}-$ | 8-Cl |  | 148–151 (from e/pe). |
| 29 | $-\underset{H}{N}-$ | 8-Cl | $-NH-CH_2-CH_2-N(CH_3)_2$ | 156–158 (from e/pe). |
| 30 | $-\underset{H}{N}-$ | H | $-NH-\underset{CH_3}{CH}-(CH_2)_3-N(C_2H_5)_2$ | (⁷). |
| 31 | $-\underset{H}{N}-$ | 7-Cl | 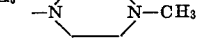 | 158–159 (from e/pe). |
| 32 | $-\underset{H}{N}-$ | 7-Cl | $-NH-CH_2-CH_2-N(CH_3)_2$ | 157–159 (from ac/H₂O). |
| 33 | $-\underset{CH_3}{N}-$ | 8-OCH₃ | 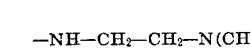 | 139 (from ac/pe). |

See footnotes at end of table.

TABLE VII—Continued

| Example | Z | $R_3$ or $R_4$ | $-N\begin{smallmatrix}R_1\\R_2\end{smallmatrix}$ | M.P. or *B.P. of the base, °C. |
|---|---|---|---|---|
| 34 | $-\underset{H}{N}-$ | 3-$CH_3$ | Same as above | 168–170 (from ac/pe). |
| 35 | $-\underset{H}{N}-$ | 8-$CH_3$ | ....do.... | 188–190 (from ac/e). |
| 36 | $-\underset{H}{N}-$ | 8-$CH_3$ | $-NH-CH_2-CH_2-N(CH_3)_2$ | 175–177 (from ac/pe). |
| 37 | $-\underset{CH_3}{N}-$ | 8-$CH_3$ | $-N\!\!\diagup\!\!\diagdown\!\!N-CH_3$ | 171–173 (from ac/pe). |
| 38 | $-\underset{H}{N}-$ | 3-Cl | Same as above | 169–171° (from e/pe). |
| 39 | $-\underset{H}{N}-$ | 3-Cl | $-NH-CH_2-CH_2-N(CH_3)_2$ | 136–137° (from e/pe). |
| 40 | —S— | H | $-N\!\!\diagup\!\!\diagdown\!\!N-CH_3$ | 102–103 (from e/po). |
| 41 | —S— | H | $-N(CH_3)_2$ | 121–122 (from ac/pe). |
| 42 | —S— | H | $-NH-CH_2-CH_2-N(CH_3)_2$ | 96–97 (from e/pe). |
| 43 | —S— | H | $-NH-N(CH_3)_2$ | 181–183 (from acetic acid ester/pe). |
| 44 | $-\underset{H}{N}-$ | 3-O$CH_3$ | $-N\!\!\diagup\!\!\diagdown\!\!N-CH_3$ | 212–214 (from ac/pe). |
| 45 | $-\underset{H}{N}-$ | H | $-N\underset{CH_3}{-}CH_2-CH_2-N(CH_3)_2$ | *168–169 (p.01 mm. Hg). |
| 46 | $-\underset{H}{N}-$ | 8-Cl | Same as above | 103–106 (from e/pe). |
| 47 | $-\underset{H}{N}-$ | 8-$CF_3$ | $-N\!\!\diagup\!\!\diagdown\!\!N-CH_3$ | 193–194 (from e/pe). |
| 48 | $-\underset{CH_3}{N}-$ | 4-S$CH_3$ | $-N\!\!\diagup\!\!\diagdown\!\!N-CH_3$ | 140 (from ac/pe) |
| 49 | $-\underset{H}{N}-$ | 2-Cl | Same as above | 203–205 (from ac/e). |
| 50 | —S— | H | $-N\!\!\diagup\!\!\diagdown\!\!O$ | *190–194 (0.07 mm. Hg).[a] |
| 51 | —S— | 6-Cl | $-N\!\!\diagup\!\!\diagdown\!\!N-CH_3$ | 82–88 (from e/pe). |
| 52 | —S— | H | $-NH-CH_2-CH_2-CH_2-N(CH_3)_2$ | 125–126 (from ac/pe). |
| 53 | —S— | H | $-N\underset{CH_3}{-}CH_2-CH_2-N(CH_3)_2$ | 89–90 (from pe). |
| 54 | —S— | H | $-N\!\!\diagup\!\!\diagdown\!\!NH$ | 122–124 (from ac/pe). |
| 55 | —S— | H | $-NH-NH_2$ | 119–121 (from acetic acid ester/pe). |
| 56 | —S— | H | $-NH-\!\!\bigcirc$ | 127–128 and 155–156 (from ac/e/pe). |
| 57 | —S— | H | $-NH-\!\!\bigcirc\!\!-Cl$ | 154–155 (from ac/e/pe). |
| 58 | —S— | H | $-N\underset{CH_3}{-}CH_2-CH_2-CH_2-N(CH_3)_2$ | 69–70 (from pe). |
| 59 | —S— | H | $NH-CH\underset{CH_3}{-}(CH_2)_3-N(C_2H_5)_2$ | 76–77 (from e/pe). |
| 60 | —S— | 8-$CH_3$ | $-N\!\!\diagup\!\!\diagdown\!\!N-CH_3$ | 151–153 (from ac/pe). |
| 61 | —S— | 8-$CF_3$ | Same as above | (b). |
| 62 | —S— | 8-Cl | ....do.... | 166–167 (from ac/pe). |
| 63 | —S— | 7-Cl | ....do.... | 136–138 (from e/pe). |

See footnotes at end of table.

TABLE VII—Continued $$-N\diagdown_{R_2}^{R_1}$$

| Example | Z | R₃ or R₄ | -N(R₁)(R₂) | M.P. or *B.P. of the base, °C. |
|---|---|---|---|---|
| 64 | —S— | 8-OCH₃ | do | 116–118 (from ac/pe). |
| 65 | —S— | 3-Cl | do | (¹⁰). |
| 66 | —S— | 7-SCH₃ | do | 113–115 (from e/pe). |
| 67 | —N(H)— | 8-CF₃ | do | 184–185 (from e/pe). |
| 68 | —N(H)— | 7-SCH₃ | do | 120/146–150 (from ac/pe). |
| 69 | —N(H)— | 8-Cl | —N(morpholino) | 169–170 (from ac/pe). |
| 70 | —N(H)— | 8-Cl | —N(piperazino)—CH₂—CH₂—OH | 241–244 (from chloroform/pe). |
| 71 | —N(H)— | 8-Cl | —N(piperazino)NH | 105–116 (from e/pe). |
| 72 | —N(H)— | 8-Cl | —N(piperazino)N—CH₂—CH₂ | 162–163 (from e/pe). |
| 73 | —N(H)— | 7-OCH₃ | —N(piperazino)N—CH₃ | 227–228 (from ac/pe). |
| 74 | —S— | 2-Cl | —NH—CH₂—CH₂—N(CH₃)₂ | 54–60 (from pe). |
| 75 | —S— | 2-Cl | —N(piperazino)NH | 132–134 (from e/pe). |
| 76 | —S— | 2-Cl | —N(piperazino)N—CH₂—CH₂—OH | (¹¹). |
| 77 | —S— | 2-Cl | —N(CH₃)—CH₂—CH₂—N(CH₃)₂ | (¹²). |
| 78 | —S— | 2-Cl | —NH—CH₂—CH₂—CH₂—N(CH₃)₂ | 104–106 (from e/pe). |
| 79 | —S— | 2-Cl | —N(CH₃)—C₆H₅ | 141–143 (from ac/pe). |
| 80 | —S— | 2-Cl | —N(morpholino) | 148–150 (from ac/pe). |
| 81 | —S— | 2-Cl | —NH—N(piperidino) | 153–154 (from e/pe). |
| 82 | —S— | 2-CH₃ | —N(piperazino)N—CH₃ | 99–107 (from pe). |
| 83 | —S— | 2-CH₃ | —N(morpholino) | 147–148 (from ac/pe). |
| 84 | —S— | 2-Br | —N(piperazino)N—CH₃ | 137–138 (from ac/pe). |
| 85 | —S— | 2-F | Same as above | 80–84 (from pe). |
| 86 | —S— | 4-CH₃ | do | 149–150 (from ac/pe). |
| 87 | —S— | 2-OCH₃ | —N(piperidino) | 116–117 (from e/pe). |
| 88 | —S— | 2-OCH₃ | —N(morpholino) | 174–175 (from ac/pe). |
| 89 | —S— | 2-Cl | —N(piperazino)N—CH₂—CH₂—OCH₃ | (¹³). |
| 90 | —N(CH₃)— | H | —NH—C₆H₄—Cl | 108–111 (from e/pe). |
| 91 | —S— | H | —NH₂ | 176–178 (from acetic acid ester/pe). |

See footnotes at end of table.

TABLE VII—Continued

| Example | Z | R₃ or R₄ | —N(R₁)(R₂) | M.P. or *B.P. of the base, °C. |
|---|---|---|---|---|
| 92 | —S— | H | —NH—⟨⟩—OCH₃ | 158–160 (from ac/pe). |
| 93 | —S— | H | —N⟨⟩N—CH₂—CH₂—OH | (14). |
| 94 | —S— | H | —N(CH₃)—CH₂—CH₂—N(C₂H₅)₂ | (15). |

[1] The hydrochloride decomposes at 230–240° C.
[2] A hygroscopic d-tartrate (1:1 mole) was obtained.
[3] A hygroscopic d-tartrate (1:1) mole was obtained.
[4] The hygroscopic dihydrochloride melts at temperatures above 160° C.
[5] The hygroscopic dihydrochloride-dihydrate decomposes (from methanol/ether) at 210° C.
[6] A hygroscopic dihydrochloride was obtained.
[7] The dihydrochloride melts, while decomposing, at 244–246° C. (from isopropanol/ether).
[8] The hydrochloride melts at 190–213° C. (from methanol/ether).
[9] The dihydrochloride melts, while decomposing, at 192° C. (from isopropanol/ether).
[10] The hydrochloride decomposes above 215° C.
[11] The hydrochloride melts at 194–200° C. (from methanol/ether).
[12] The hydrochloride melts at 196–197° C. (from ethanol/ether).
[13] The dihydrochloride melts at 215–225° C. (from methanol/ether).
[14] The hydrochloride melts at 230–248° C. (from methanol/ether).
[15] The hydrochloride melts at 179–180° C. (from methanol/ether).

EXAMPLE 95

2.0 g. of 2 - nitro-10,11-dihydro-11-oxo-dibenzo[b,f][1,4]-thiazepine (M.P. 270–286° C. dec.) and 1 ml. of N,N-dimethylaniline are refluxed with 15 ml. of phosphorus oxychloride for 5 hours after which the reaction mixture is evaporated to dryness in vacuo. The residue is treated with xylene, once again evaporated in vacuo and then refluxed for 16 hours with 15 ml. of N-methylpiperazine and 10 ml. of dioxane. After evaporating to dryness in vacuo the residue is distributed between ether and dilute aqueous ammonia solution. The ether phase is washed twice with water and then shaken out with dilute acetic acid. The base is set free from the acid extracts by addition of concentrated ammonia solution and taken up in ether. The ether phase is washed four times with water, dried over sodium sulphate and evaporated. The resinous residue obtained is then dissolved in ether, filtered through aluminium oxide and evaporated. The residue is crystallized from acetone/petroleum ether to give 1.7 g. of 2-nitro-11-(4 - methyl-1-piperazinyl)-dibenzo[b,f][1,4]thiazepine in the form of yellow matted needles of melting point 141–142° C.

EXAMPLE 96

4.5 g. of 2 - dimethylaminosulphonyl-10,11-dihydro-11-oxodibenzo[b,f][1,4]thiazepine (M.P. 283–284° C.) and 1.3 ml. of N,N-dimethylaniline are refluxed in 40 ml. of phosphorus oxychloride for 4.5 hours. The excess phosphorus oxychloride is then distilled off in vacuo and the residue is dissolved in xylene. The xylene solution is poured onto ice/water, shaken out twice with dilute hydrochloric acid and once with water, dried over sodium sulphate and then concentrated to 100 ml. in vacuo. 8 ml. of N-methylpiperazine are added and the reaction mixture is refluxed for 4 hours and then treated with dilute soda lye and water. The xylene phase is separated and shaken out with dilute hydrochloric acid. The acid extracts are made alkaline with concentrated ammonia solution and the base which separates is extracted with chloroform. After drying over sodium sulphate the chloroform extracts are evaporated in vacuo. The residue is crystallized from acetone/petroleum ether whereby 4.9 g. of 2-dimethylaminosulphonyl-11-(4-methyl - 1 - piperazinyl) - dibenzo[b,f][1,4]thiazepine are obtained in the form of slightly yellow needles of melting point 192–193° C.

EXAMPLE 97

3.72 g. of 2 - amino-2'-(4''-methyl-1''-piperazinyl-carbonyl)-4'-nitro-diphenylsulphide (M.P. 184–187° C.) and 1 ml. of N,N-dimethylaniline are refluxed for 3 hours in 20 ml. of phosphorus oxychloride after which the reaction mixture is evaporated to dryness. The residue is treated with xylene, once again evaporated and then partitioned between benzene and dilute hydrochloric acid. The base is set free from the acid extracts with concentrated ammonia solution and taken up in benzene. The benzene solution is exhaustively extracted with dilute acetic acid and the acetic acid extracts are treated with active charcoal. The basic fraction is set free, under ice-cooling, with concentrated ammonia solution and taken up in chloroform. The chloroform extracts are washed with water, dried over sodium sulphate and evaporated. The residue is dissolved in ether and filtered through aluminium oxide. The residue obtained after evaporation of the solvent is systematically crystallized from acetone/ether/petroleum ether. The first fraction to crystallize is 0.6 g. of starting material. 0.72 g. of 2-nitro-11-(4-methyl-1-piperazinyl)-dibenzo[b,f][1,4]thiazepine of melting point 138–141° C. are obtained from the more soluble portion. This compound is identical to the product obtained according to Example 95.

EXAMPLE 98

11.5 g. of 1-nitro-11-(4-methyl-1-piperazinyl)-dibenzo[b,f][1,4]thiazepine obtained according to Example 95 are mixed with 24.5 g. of stannous chloride and while stirring and cooling with ice, treated dropwise with dilute hydrochloric acid (23.8 ml. of concetrated hydrochloric acid and 100 ml. of water). The reaction mixture becomes lighter in colour and a white precipitate is formed. After the addition is complete the reaction mixture is stirred for a further 20 minutes while cooling, then for 15 minutes at 40° C. The reaction mixture is thereupon made strongly alkaline with concentrated soda lye and the precipitate taken up in ether. The ether phase is exhaustively shaken out with dilute acetic acid and the base liberated from the acetic extracts by addition of concentrated ammonia solution and taken up in ether. The ether phase is washed with water, dried over sodium sulphate and evaporated. The residue is dissolved in ether, filtered through aluminium oxide and evaporated. After crystallization of the residue from ether/petroleum ether 10.05 g. of 2 - amino-11-(4-methyl-1-piperazinyl)-dibenzo[b,f][1,4]thiazepine are obtained as colourless prisms of melting point 165–167° C.

EXAMPLE 99

A solution of 3.4 g. of sodium metaperiodate in 40 ml. of water is added in one lot to a solution of 5.3 g. of 2-nitro-11-(4-methyl - 1 - piperazinyl)-dibenzo[b,f][1,4]

thiazepine, obtained according to Example 95, while stirring under ice-cooling. The reaction mixture is then stirred at room temperature for 5 hours and left to stand overnight. After diluting with water and treating with active charcoal the basic fraction is set free under ice-cooling with concentrated soda lye and taken up in benzene.

By analogous procedures as in Examples 95-97 e.g., the products given in the following Table VIII are obtained. In the table Z', R'$_1$ and R'$_2$ have the above defined meaning. In the column on the right hand side ac means acetone, e=ether, ch=chloroform, me=methanol and pe=petroleum ether.

TABLE VIII

| Example | Z' | R'$_1$ | R'$_2$ | Melting point, ° C. |
|---|---|---|---|---|
| 101 | S | H | —NO$_2$ | Base: 153-155 (from ac/pe). |
| 102 | S | —CH$_2$—CH$_2$—OH | —NO$_2$ | Base: 130-134 (from ac/pe). |
| 103 | S | H | —SO$_2$N(CH$_3$)$_2$ | Base: 186-188 (from ch/e). |
| 104 | NH | —CH$_3$ | —SO$_2$N(CH$_3$)$_2$ | Base: 193-195 (from ac/pe). |
| 105 | S | —CH$_3$ | —SO$_2$CH$_3$ | Base: 219-223 (from ac/pe). |
| 106 | S | H | —SO$_2$CH$_3$ | Base: 180-183 (from ch/pe). |
| 107 | S | —CH$_3$ | —SO$_2$C$_2$H$_5$ | Base: 169-170 (from ch/pe). |
| 108 | S | H | —SO$_2$C$_2$H$_5$ | Maleate: 180-185 (from me/ac/e). |
| 109 | NH | —CH$_3$ | —NO$_2$ | Base: 110-112 (from ac/pe). |
| 110 | NH | H | —SO$_2$N(CH$_3$)$_2$ | Base: 147-150 (from ac/pe). |
| 111 | NH | —CH$_3$ | —SO$_2$CH$_3$ | Dihydrobromide: 225-230 (dec.; from me/ethyl acetate). |
| 112 | NH | H | —SO$_2$CH$_3$ | Dihydrobromide: 233-248 (from me/ethyl acetate). |
| 113 | S | H | —SO$_2$NHCH$_3$ | Base: 218-222 (from ac/pe). |
| 114 | S | —CH$_3$ | —SO$_2$NHCH$_3$ | Base: 168-170 (from ac/pe). |
| 115 | SO | H | —NO$_2$ | Base: 174-176 (from ac/pe). |

The benzene solution is washed with water, dried over sodium sulphate and concentrated. The solution is filtered through aluminium oxide and evaporated to dryness. The residue is crystallized from acetone and acetone/petroleum ether to give 4.3 g. of 2-nitro-11-(4-methyl-1-piperazinyl)-dibenzo[b,f][1,4]thizaepine-5-oxide in the form of yellow matted needles of melting point 182-185° C.

EXAMPLE 100

A solution of 3.42 g. of sodium metaperiodate in 10 ml. of water is given in 3 portions to a stirred solution of 6.24 of 2-dimethylaminosulphonyl-11-(4-methyl-1-piperazinyl)-dibenzo[b,f][1,4]thiazepine obtained according to Example 96, in 40 ml. of water and 10 ml. of glacial acetic acid at 0° C. A precipitate which appears is brought into solution by adding 20 ml. of 2 N acetic acid. The reaction mixture is kept at room temperature for 24 hours, then made alkaline with concentrated soda lye and shaken out with chloroform. The chloroform extracts are washed with water, dried over sodium sulphate and evaporated to dryness in vacuo. The residue is crystallized from acetone/petroleum ether to give 5.9 g. of 2-dimethylaminosulphonyl - 11 - (4 - methyl-1-piperazinyl)-dibenzo[b,f][1,4]thiazepine-5-oxide of melting point 208-210° C.

We claim:

1. 2-dimethylaminosulphonyl - 11 - (4-methyl-piperazinyl)-dibenzo[b,e][1,4]diazepine and its non-toxic pharmaceutically acceptable acid addition salts.

2. 2-nitro-11-(4-methyl-piperazinyl) - dibenzo[b,e][1,4]diazepine and its non-toxic pharmaceutically acceptable acid addition salts.

3. 2-dimethylaminosulphonyl - 11 - piperazinyl-dibenzo[b,e][1,4]diazepine and its non-toxic pharmaceutically acceptable acid addition salts.

References Cited

UNITED STATES PATENTS

| 3,084,160 | 4/1963 | Jacob | 260—268 X |
| 3,268,557 | 8/1966 | Weber | 260—268 |
| 3,458,516 | 7/1969 | Howell et al. | 260—268 |
| 3,462,436 | 8/1969 | Fouche | 260—268 |
| 3,546,226 | 12/1970 | Schmutz et al. | 260—268 |

OTHER REFERENCES

Chem. Abstr., vol. 70, col. 96835V (1969), Abstracting S. African, 6001, 370.

DONALD G. DAUS, Primary Examiner